United States Patent
Boivie et al.

(10) Patent No.: US 6,785,275 B1
(45) Date of Patent: Aug. 31, 2004

(54) METHOD AND SYSTEM FOR CREATING SMALL GROUP MULTICAST OVER AN EXISTING UNICAST PACKET NETWORK

(75) Inventors: Richard Harold Boivie, Monroe, CT (US); Kiyoshi Maruyama, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/524,410

(22) Filed: Mar. 13, 2000

(51) Int. Cl.⁷ .............................................. H04L 12/56
(52) U.S. Cl. ...................... 370/390; 370/401; 370/408
(58) Field of Search ................................ 370/390, 393, 370/401, 408, 397; 709/238; 398/82

(56) References Cited

U.S. PATENT DOCUMENTS

| | | | |
|---|---|---|---|
| 5,361,256 A | | 11/1994 | Doeringer et al. |
| 5,517,494 A | * | 5/1996 | Green .......................... 370/408 |
| 5,555,244 A | * | 9/1996 | Gupta et al. ................. 370/397 |
| 5,617,421 A | | 4/1997 | Chin et al. |
| 5,946,316 A | * | 8/1999 | Chen et al. ................... 370/408 |
| 6,088,336 A | * | 7/2000 | Tosey .......................... 370/408 |
| 6,347,090 B1 | | 2/2002 | Ooms et al. |
| 6,370,142 B1 | | 4/2002 | Pitcher et al. |
| 6,442,617 B1 | | 8/2002 | Lowe et al. |
| 6,466,343 B1 | * | 10/2002 | Lahat et al. .................. 398/82 |
| 6,502,140 B1 | * | 12/2002 | Boivie ......................... 709/238 |
| 6,597,703 B1 | | 7/2003 | Li et al. |
| 6,600,743 B1 | | 7/2003 | Lee et al. |
| 6,606,706 B1 | | 8/2003 | Li |
| 2003/0165140 A1 | * | 9/2003 | Tang et al. .................. 370/393 |

OTHER PUBLICATIONS

Connectionless Multicast (CLM), draft–ooms–c1–multicast–01.txt, 46th IETF, Nov. 1999.
Frequently Asked Questions (FAQ) on the Multicast Backbone (MBONE) Feb. 28, 2000, pp. 1–12.

* cited by examiner

Primary Examiner—Salvatore Cangialosi
(74) Attorney, Agent, or Firm—Richard M. Ludwin, Esq.; McGinn & Gibb, PLLC

(57) ABSTRACT

A routing table for use with a router in a world-wide network, includes an existing routing table with a multicast-destination (MD) column.

36 Claims, 5 Drawing Sheets

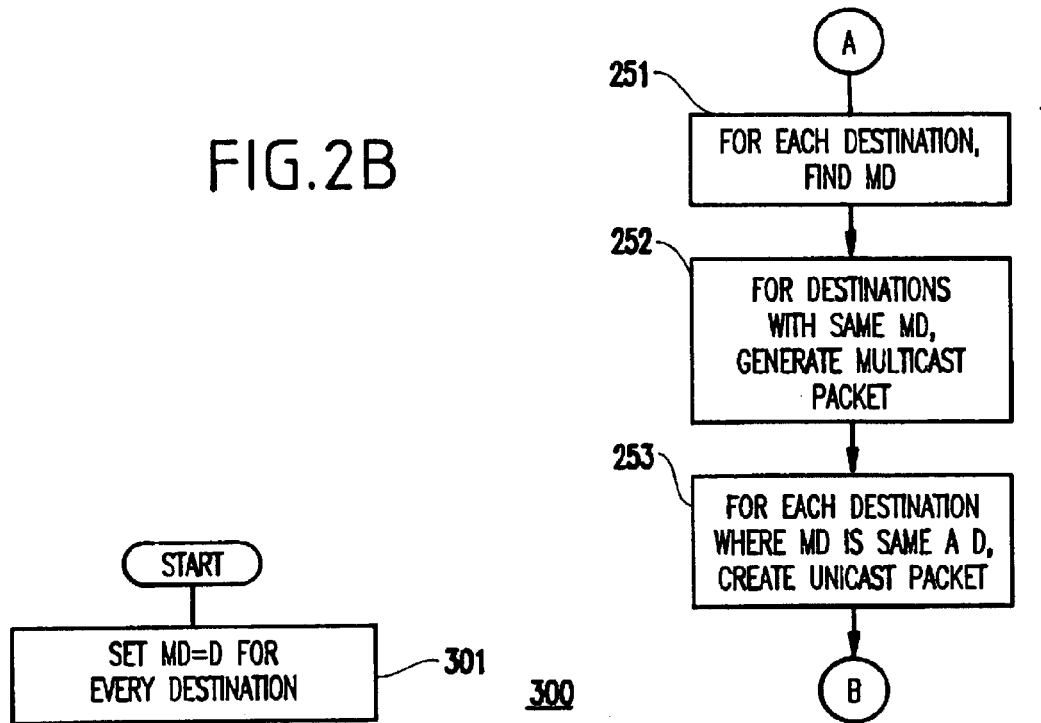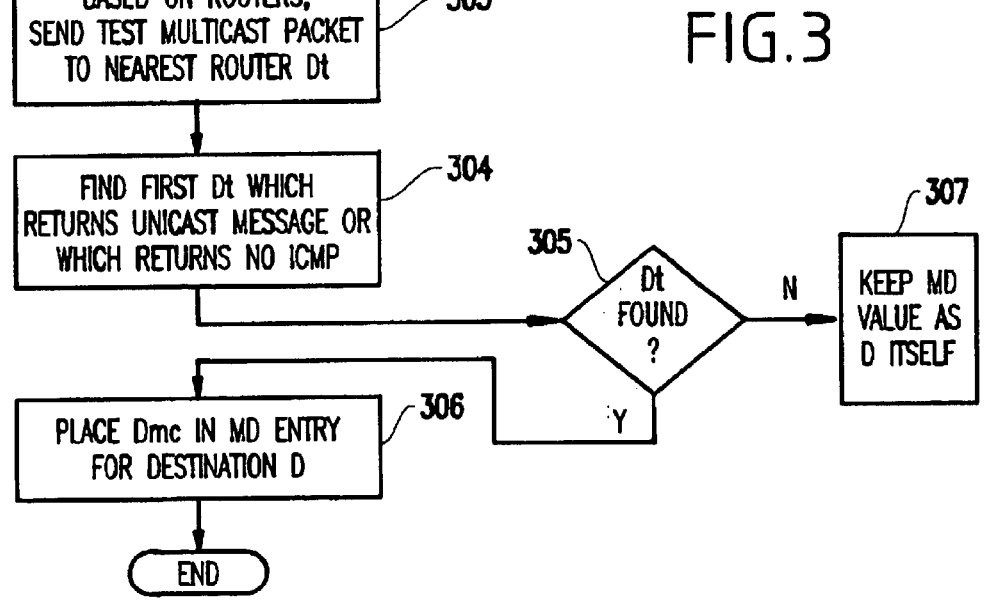

METHOD AND SYSTEM FOR CREATING SMALL GROUP MULTICAST OVER AN EXISTING UNICAST PACKET NETWORK

CROSS-REFERENCE TO RELATED APPLICATIONS

The present application is related to U.S. patent application Ser. No. 09/524,409, filed on Mar. 13, 2000, to Kiyoshi Maruyama, entitled "METHOD AND SYSTEM FOR AMICABLE SMALL GROUP MULTICAST IN A PACKET-SWITCHED NETWORK" having IBM Docket No. YO999-373, incorporated herein by reference.

BACKGROUND OF THE INVENTION

1. Field of the Invention

The present invention generally relates to the global Internet, and more particularly to Internet routing protocols for supporting multicast packet delivery.

2. Description of the Related Art

The Internet is the world's largest network, and it has become essential to businesses as well as to consumers. The success of Internet is partly due to the simplicity of routing protocols used in the network for packet delivery.

There are basically three types of packets delivery mechanisms including "unicast" that allows the delivery of information from a source to a particular destination, "broadcast" that allows the delivery of information from a source to every destination in the network, and "multicast" that allows the delivery of information from a source to a selected group of destinations in the network.

Today, in the Internet, the multicast is supported by using routers called "Class D" routers. In this scheme, prior to conducting the multicast, necessary resources are reserved at those involved Class D routers. Then, multicast may be started. At the conclusion of the multicast, such reserved resources must be freed so that they become available for other multicasts.

Because of this reservation and resource allocation involvement, this Class D router-based multicast scheme is suitable for supporting relatively long lasting multicasts (e.g., minutes instead of seconds to minimize the overhead of reservation) that involve large numbers of destinations.

However, because of this reservation and resource allocation involvement, it is not suitable for supporting a large numbers of small group multicasts, due to reservation time and resource consumption at each Class D router to keep track of the state of each multicast.

Moreover, because each Class D router must create entries for each multicast group and this entry occupies a certain space, only a finite number of multicasts can be supported.

A way to support an extremely large number of small multicast groups is to let each packet carry routing destinations and alleviate routers from keeping track of states of individual multicast.

There are basically two distinctive methods to carry destinations for multicast purposes. A first method carries a list of multicast destinations and indicates that the packet is a multicast packet (e.g., namely indicating that a packet is not a unicast packet).

A second method is to carry multicast routing information (e.g., sometimes referred to as "source routing" or "routing tree") that includes the multicast destinations and indicates that the packet is a multicast packet.

The second approach has many drawbacks. For example, a source node must create a proper routing sub-tree that contains multicast destinations that is computation intensive, a routing tree description becomes a substantial overhead of each multicast packet, and a new multicast-enabled router must perform a fairly complex routing sub-trees regeneration process for every multicast packet received.

Therefore, desirable solutions for small group multicast are based on a multicast packet that carries a list of multicast destinations and simply indicates that the packet is a multicast packet delivery (e.g., this indicator allows a new multicast router to differentiate multicast packets easily from unicast packets).

In this approach, there are two distinctive Internet Protocol (IP) packet formats for small group multicast depending on how the IP destination address field is used for multicasting packets. Both formats have a control field bit (MC) indicating whether or not a given packet is a multicast (MC=1) or unicast (MC=0).

One type of multicast packet format is to place one of the multicast destination IP addresses into the IP packet destination field and the remainder of multicast destination IP addresses in the OPTIONS field of the IP packet.

Another type of multicast packet format is to choose a multicast-capable router (e.g., the router that supports the new multicast routing protocol) in the network and place its IP address into the IP packet destination field, and place all of the multicast destination IP addresses in the OPTIONS field. Each of these two formats offers a completely different implementation of routing algorithms and each gives pros and cons. The present invention, as described in detail below, claims an innovative multicast routing solution when the latter multicast packet format has been used (e.g., choosing a multicast capable router and placing an IP address into the IP packet destination field and placing all of the multicast destination IP addresses in the OPTIONS field).

SUMMARY OF THE INVENTION

In view of the foregoing and other problems of the conventional methods and structures, an object of the present invention is to provide a method and structure in which a multicast scheme and method are realized that are suitable for simultaneously supporting a very large number of small group multicasts.

Another object of the present invention is to support gradual introduction of the new multicast-capable router(s) into the network without introducing any disruptions to on-going operations.

Yet another object of the present invention is to introduce a scheme where the introduction of a single multicast-capable router will enable the entire network multicast-capable.

A further object of the present invention is to guarantee the optimum multicast routing (e.g., each packet will be delivered from a multicast-capable router to every destination along the shortest path defined in the exiting unicast routing).

Another object of the present invention is to provide a scheme that improves resource utilization and multicast efficiency as the number of multicast-capable routers are introduced into the network and as the existing unicast routers are upgraded to the new multicast-capable routers.

A still further object of the present invention is to utilize the existing unicast routing protocols for determining multicasting routes.

Another object of the present invention is to impose no new functional requirement at each multicast destination node by guaranteeing that each destination always receives unicast packets.

Yet another object of the present invention is to allow simple swapping of the existing unicast routing protocol software with the new multicast-capable routing protocol software.

In a first aspect of the present invention, a routing table for use with a router in a world-wide network, includes extending an existing routing table to include a "multicast-destination" (MD) column.

In a second aspect, a routing system, includes a routing unit for updating a next-node (NN) column of a routing table and for routing unicast packets by referencing the NN column of the routing table, a packet regeneration unit for referencing a column MD of the routing table and for selectively creating copies of at least one of unicast and multicast packets, and a multicast-destination (MD) discovery unit for updating the MD column of the routing table.

In a third aspect, a method of processing a packet, includes receiving a packet at a router, checking by the router if the packet's destination is itself or not, if the packet's destination is not the router, then the said packet is routed in a traditional manner, and if the received packet's destination is itself and if an entry in a routing table is MC=1 indicating that the packet is a multicast packet, then forwarding the packet to a packet regeneration process.

The present invention, as described in detail below, claims an innovative multicast routing solution when the latter multicast packet format has been used (e.g., choosing a multicast capable router and placing IP address into the IP packet destination field and placing all of the multicast destination IP addresses in the OPTIONS field). The Internet IP packet which support this latter multicast packet format may appear as the following: in addition to other fields of the Internet IP packet, it has a PROTOCOL field indicating that the packet is a small group multicast, the Source IP Address representing the source of the multicast packet, the Destination IP Address representing the address of one of the small group multicast capable routers in the network, and the OPTIONS field. The OPTIONS field contains CODE indicating small group multicast, contains LENGTH indicating the total number of bytes for multicast destinations (equivalent to the number of destinations), contains POINTER indicating the start position of multicast destinations, and followed by the IP addresses of the small group multicast destinations.

With the unique and unobvious aspects of the invention, an unlimited number of "small" multicasts can be supported. For purposes of the present application, "small" is preferably a number of the group being less than ten (10), but of course the number depends on the designer's constraints and requirements. A small group is preferable since each packet must carry the destinations that belong to the multicast group. Hence, if there are ten (10) people in the distribution list, then a first packet must carry nine destination addresses. Similarly, if there are 20 people, then the first packet must carry 19 addresses. The smaller the group size, the smaller the packet overhead becomes. Hence, the present invention is especially advantageous, for example, when a few people (e.g., a small group) are to have a conference, conduct messaging etc., over the Internet or another similar network.

Therefore, in the present invention, each multicast packet (indicated by MC=1) carries multicast destinations in the OPTIONS field, and its IP destination address is set to one of a plurality of multicast-capable routers in the network.

Another key advantage of the invention is that a conventional routing table is taken and modified. That is, the invention extends the conventional routing table to include a multicast capable router destination information. Hence, the invention is not building a new table, but is simply modifying an existing table in a unique and unobvious way.

Yet another key advantage of the invention is that the new multicast capable routers can coexist with the conventional routers or any number of conventional routers' routing software can be upgraded to the new multicast capable routing software.

Still another key advantage of the invention is that no performance penalty is imposed on the conventional unicast routing.

BRIEF DESCRIPTION OF THE DRAWINGS

The foregoing and other purposes, aspects and advantages will be better understood from the following detailed description of preferred embodiments of the invention with reference to the drawings, in which:

FIG. 2B illustrates a regeneration process 250;

FIG. 3 illustrates a flow of an exemplary discovery algorithm for use with the present invention;

DETAILED DESCRIPTION OF PREFERRED EMBODIMENTS OF THE INVENTION

Figure 1:
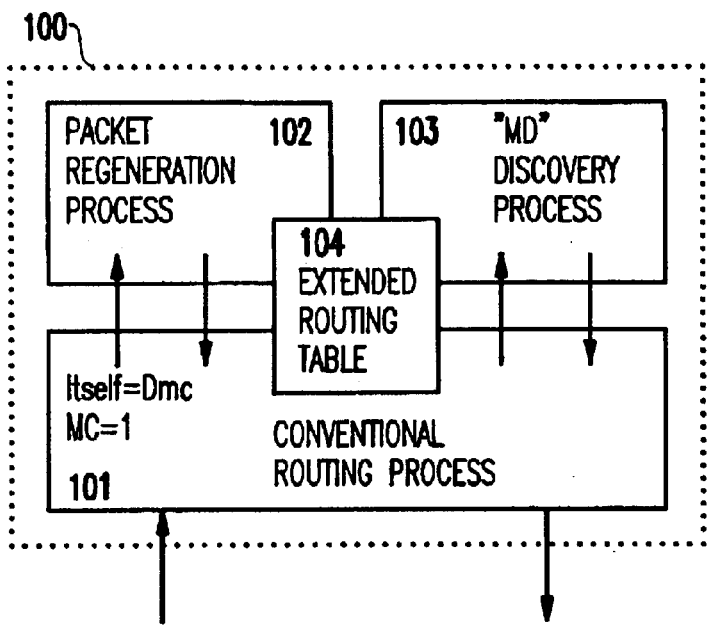
FIG. 1 illustrates a routing system of a multicast router according to the present invention.

Referring now to the drawings, and more particularly to FIGS. 1–6, there are shown preferred embodiments of the method and structures according to the present invention.

PREFERRED EMBODIMENT

Generally, the present invention provides a scheme and method for creating small group multicast network without disrupting the existing unicast network, yet provides an optimal delivery of each multicast packet. The invention assumes that each multicast packet has an indicator indicating the packet is a small group multicast (i.e., MC=1), carries a list of multicast destinations within the packet header (e.g., in the OPTIONS field of the Internet IP packet), and the packet destination field (when MC=1) contains a new multicast-capable router in the network. Any packet with MC=0 is a unicast packet, and therefore its destination field carries the packet destination itself (rather than a router address).

The present invention also assumes that a network contains at least one multicast-capable router, and that each multicast source node knows (or has a means to determine) the address of the nearest multicast-capable router.

In the present invention, a multicast packet (MC=1) is denoted by (S,Dmc,1(D1,D2, . . . , Dk)) where:

TABLE 1

| Symbol | Description |
| --- | --- |
| S | The packet source (origin) node address |
| Dmc | The address of a new multicast-capable router that is denoted by a symbol Rmc |
| (D1, D2, . . . Dk) | k destination addresses |
| MC = 1 | 1 indicates that the packet is multicast, while 0 indicates that the packet is unicast |

A packet that travels in a packet switched network such as the Internet carries, in addition to the above information, many other fields for routing and control and the payload.

A key aspect of the invention is extending the existing routing table by adding a new column to the conventional routing table. As described in further detail below, and as shown in Table 2, this column is referred to as "multicast destination (MD)". This means that, for each destination row in the routing table, there is an MD entry. This MD column is used by the multicast-capable router when it has received a multicast packet for routing. In an exemplary implementation, the extended routing table may appear as below in Table 2:

TABLE 2

| Destination | Next-Node | Distance to Destination | Multicast Destination (MD) |
| --- | --- | --- | --- |
| D | NN | d(D) | Dmc or D |

The first three columns (i.e., destination, next-node, distance to destination) represent the columns in the conventional routing table.

The fourth column labeled "Multicast Destination (MD)" is the extension provided by the present invention. For each destination node D, the MD entry indicates either Dmc, the address of a multicast-capable router Rmc in the network, or the destination D itself.

MD=D when there is no Rmc along the shortest route from the current router to the destination D.

MD=Dmc when there is an Rmc along the shortest route to the destination D. The destination Dmc of MD=Dmc is the address of the multicast-capable router Rmc that is nearest to the current router along the shortest route to the destination D.

It is noted that the Source Node (S) of a multicast packet is responsible for creating a multicast packet of the form (S,Dmc,1(D1,D2, . . . ,Dk)) where destination Dmc is the nearest multicast router Rmc to the source node S. A source node is either informed of the address Dmc of the nearest multicast-capable router Rmc, or the source node may run a "discovery" algorithm to locate (e.g., determine) the nearest mulitcast-capable router Rmc.

When a conventional router (i.e., not a multicast-capable router) has received a multicast packet, since it has no capability of knowing that the received packet is a multicast packet, it simply routes the packet to its destination Dmc by referencing the conventional routing table.

When a packet has been received by a multicast-capable router, Rmc, it first checks whether or not the packet destination is itself. If the packet destination is not itself, this router simply treats the packet as a unicast packet and routes it. If the packet destination is itself and MC=1, then the packet will be handed over to the multicast-routing process.

The multicast-routing process runs an algorithm that references the new column (MD) of the extended routing table and performs a "packet regeneration" process and then the conventional routing process. This packet regeneration process creates either unicast packets and/or multicast packets with no duplication thereof, and then "feeds them" to the existing IP routing algorithm. Then, the existing routing algorithm routes each "regenerated" packet as if like a unicast packet, and send it out to the next-node by referencing the existing routing table. The last multicast-capable router Rmc to a destination node D will always create a unicast packet. Therefore, the inventive system guarantees that each destination node always receives a unicast packet.

As mentioned above, the multicast packet source node is responsible for creating the multicast packet in the form of (S,Dmc, 1(D1,D2, . . . ,Dk)) for multicast destinations D1, D2, . . . , Dk, where S is the source node, and Dmc is the address of the nearest known multicast capable router Rmc.

The source node is expected to know its nearest mulitcast-capable router Rmc so that any multicast packet it creates can be sent to the nearest known mulitcast-capable router Rmc that has the address Dmc for multicasting. If the source node is unaware of such an Rmc, the source node is not allowed to create any multicast packet, but instead creates a unicast packet for each destination.

There are at least two ways to know the address Dmc of the nearest multicast-capable router Rmc. A first way is that each source node obtains its nearest Rmc (Dmc) information from a centrally located data base which is kept updated. This is equivalent of getting into a web site called "Rmc.com" and downloading the nearest Rmc from the web site.

A second way is that each source node runs a "discovery algorithm" (e.g., an exemplary discovery algorithm being described below) to each multicast destination and find the nearest Rmc.

An exemplary discovery algorithm first runs the "traceroute" to a destination. This "traceroute" returns the sequence of nodes visited (i.e., traced route) from the source node to the destination node.

Then, for each node along the traced route, a multicast packet is sent having the form (S,Dt,1(S)), where Dt is a node along the traced route. Such sending is performed from the nearest Dt first. When Dt is a multicast-capable router Rmc, it will return a unicast packet of (S,S). This returning of a unicast packet of (S,S) is the result of Rmc processing the received multicast packet (S,Dt,1(S)). Otherwise, Dt will return a control message of "parameter problem (e.g., Internet Control Message Protocol (ICMP) message in the case of the Internet)" to the source node S. When node S receives a unicast packet of (S,S), after sending (S,Dt,1(S)) then node S learns that Dt is a multicast-capable router and how far away it is located from S and it stops further testing. Node S repeats the above process to different destinations and may discover additional multicast-capable routers. Node S then chooses the one nearest to it among all the discovered multicast-capable routers.

FIG. 1 illustrates the routing system of the inventive multicast-capable routing system 100. The routing system 100 includes a conventional routing process 101 that is responsible for updating the next-node (NN) column of an extended routing table 104 and also is responsible for routing unicast packets by referencing the NN column of the routing table.

System 100 also includes a packet regeneration process 102 that references the column MD of the extended routing table 104 (e.g., also illustrated in Table 2 above) and creates appropriate copies of unicast and/or multicast packets. These copies are then forwarded to the conventional routing process 101 for conventional (i.e., unicast) routing.

System 100 also includes the multicast-destination (MD) discovery process 103 that is responsible for updating the MD column of the extended routing table 104 by running the discovery algorithm (this algorithm will be described later) periodically.

Figure 2A:
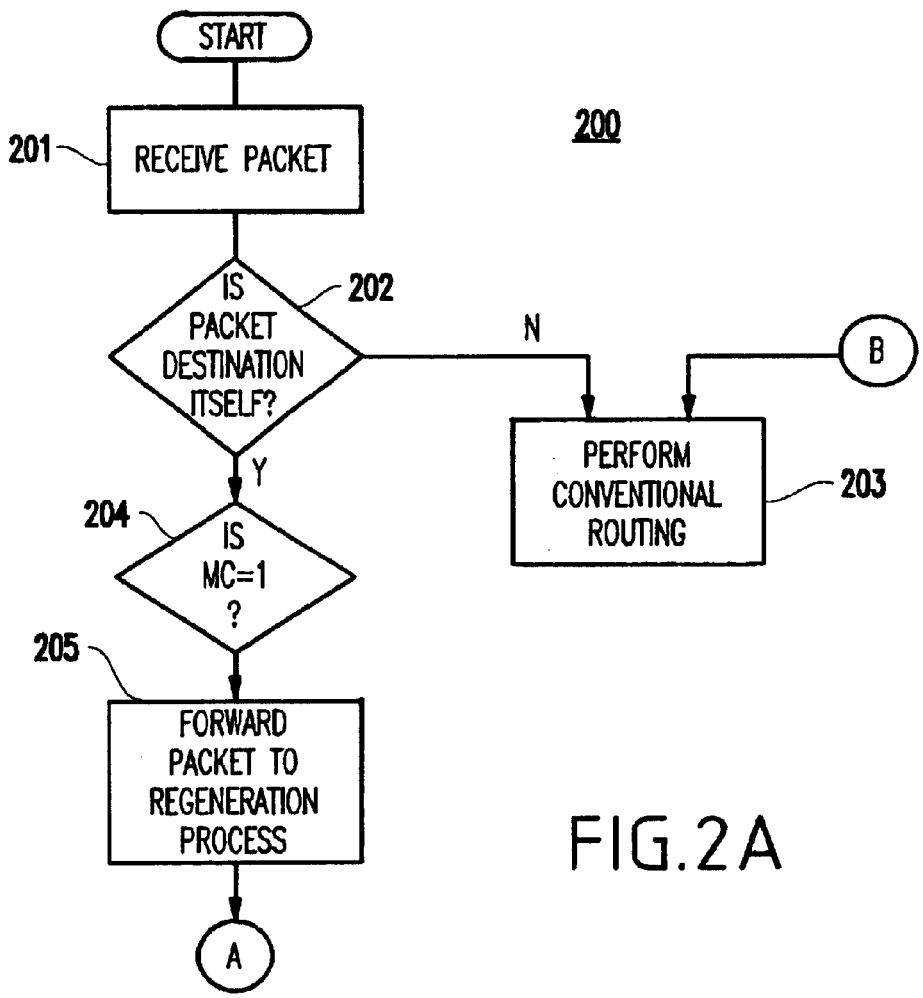
FIG. 2A illustrates a flow of the inventive process 200.

Turning to FIG. 2A and a flowchart of the inventive method 200, in operation, when a packet is received at the routing system (router) 100 in step 201, in step 202 the router first checks if the packet's destination is itself or not. If not, the conventional routing process 101 takes care of the packet and routes it as usual in step 203.

If the received packet's destination is itself as determined in step 202, then it is determined whether MC=1 (e.g., indicating that the packet is a multicast packet) in step 204. If the packet is a multicast packet, then the packet is forwarded to the packet regeneration process 102 (e.g., process 250 shown in FIG. 2B). That is, the packet regeneration process 102 runs an algorithm 250 for the packet (S,Dmc,1(D1,D2, . . . ,Dk)), as shown in FIG. 2B.

In the packet regeneration method of FIG. 2B, in Step 251, for each destination, D1 through Dk, the multicast destination MD is found from the extended routing table 104.

Then, in step 252, for those destinations which have the same MD, a multicast packet is generated having the form (S,MD,1(destinations)) with the rest of the fields in the packet being the same as the originally received packet. In step 253, for each of those destinations where the MD is the same as the destination (i.e., MD=D), a unicast packet of the form (S, D) is created with the rest of the fields in the packet the same as the originally received packet.

Then, those regenerated packets are handed over to the conventional routing process 101 (e.g., step 203 in FIG. 2A) for routing.

The MD discovery process 103 runs the "discovery algorithm" for each and every destination in the extended routing table periodically (or whenever some portion of the traditional routing table has changed or whenever it has learned that a multicast-capable router has been added, or any existing router has been upgraded to "multicast-capable").

In an exemplary implementation, as shown in FIG. 3, the MD discovery process may involve the following steps. The following assumes that the discovery process is executed at a multicast-capable router node S.

That is, in step 301, the MD entry in the extended routing table is set to D for every destination D.

In step 302, a "traceroute" is run to destination D. This gives a sequence of routers (e.g., traced route) from S to the destination D.

In step 303, in the sequence of routers from S to the destination D obtained in Step 302, a "test" multicast packet of form (S,Dt,1(S)) is created for each router Dt in the traced route and transmitted for testing.

Then, in step 304, the very first Dt is found which returns the unicast message of (S,S), or the one that did not return the ICMP control message of "parameter problem". Such destination Dt is the nearest multicast-capable router Rmc. In step 305, it is determined whether a Dt was found. If so, in step 306, its address Dmc is placed in the MD entry for the destination D. If no router Dt (and router Rmc) has been found, the MD value remains as D itself, as in step 307.

Figure 4:
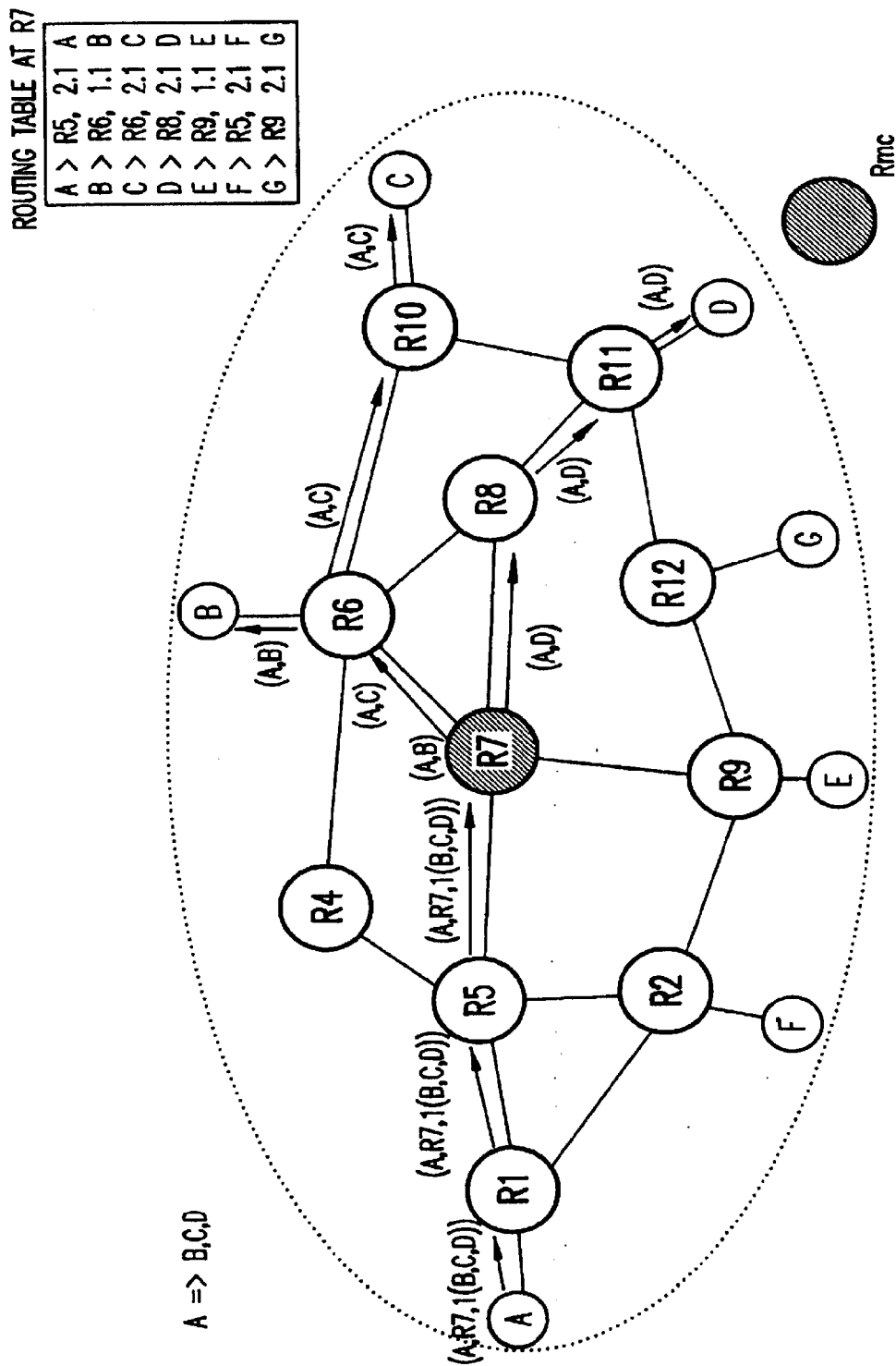
FIG. 4 illustrates a first exemplary multicast routing process.

FIG. 4 illustrates a first example of an operation of the multicast routing scheme according to the present invention.

In this exemplary operation, it is assumed that twelve routers, R1 through R12, exist in which R7 is the inventive multicast capable router (Rmc). FIG. 4 also illustrates seven edge nodes A through G. The extended routing table at the router R7 is also illustrated. It is noted that this extended routing table contains the "MD" column that is identical to the destination column D since there is no other multicast capable router other than R7 in the example shown.

This example shows the multicasting of a packet from edge node A to destinations B, C and D. Here, it is assumed that the edge node A knows that the router R7 is multicast-capable. The edge node A creates a multicast packet of "form" (A,R7,1(B,C,D)) and then forwards it to R1, the router to which the edge node A is connected.

R1 simply routes the packet by referring to its routing table for the destination R7 and sends the packet to R5. Router R5 performs a similar operation and sends the packet to router R7.

Router R7 receives the packet and realizes that the packet destination R7 is itself. R7 also recognizes that the received packet is a multicast packet, and thus initiates the "packet regeneration and routing" process (e.g., process 250 of FIG. 2B). As a result, R7 generates three unicast packets. That is, it generates (A,B) and (A,C) to router R6 and (A,D) to router R8. Each of these unicast packets is routed through routers until it arrives at its destination node.

Figure 5:
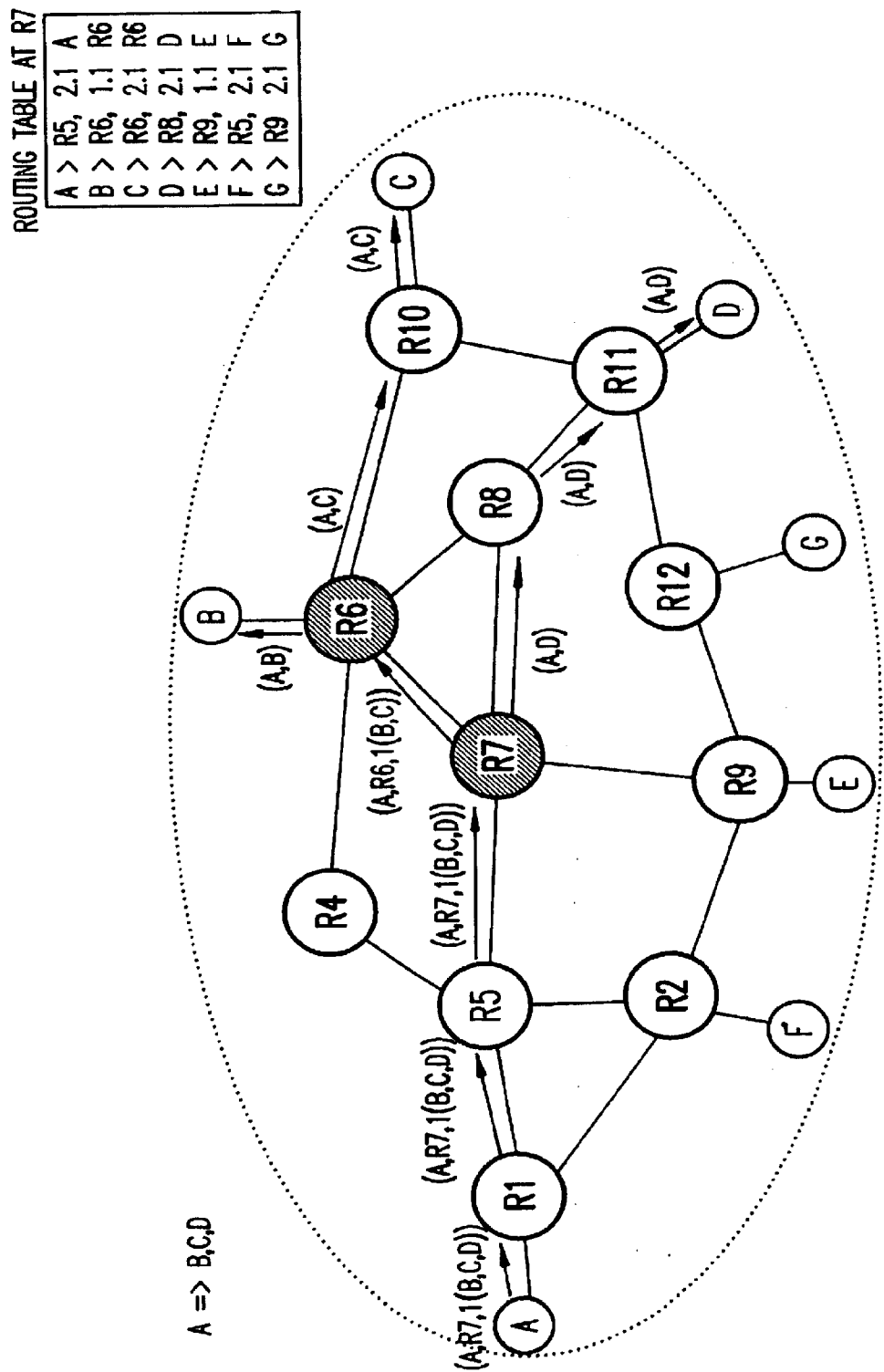
FIG. 5 illustrates a second exemplary multicast routing process.

FIG. 5 illustrates the identical example of multicast routing illustrated in FIG. 4. However, in this example the routers R6 and R7 are assumed to be multicast-capable. As illustrated in the extended routing table at router R7, the "MD" column is now different from the destination column D, due to R6 being capable of performing multicast.

In the "MD" column, for destinations B and C, the router R6 appears as the multicast destination (MD). Here again, it is assumed that the edge node A knows that the router R7 is the "nearest" multicast capable router. The edge node A creates a multicast packet of form (A,R7,1(B,C,D)) and forwards it to router R1. This packet eventually arrives at router R7. Since R7 is multicast capable, it will initiate the packet "regeneration and routing" process (e.g., process 250 of FIG. 2B). It will regenerate two packets. That is, one packet of form (A,R6,1(B,C)) will be generated and routed to router R6, and a unicast packet of form (A,D) will be generated and routed to the next router R8.

Figure 6:
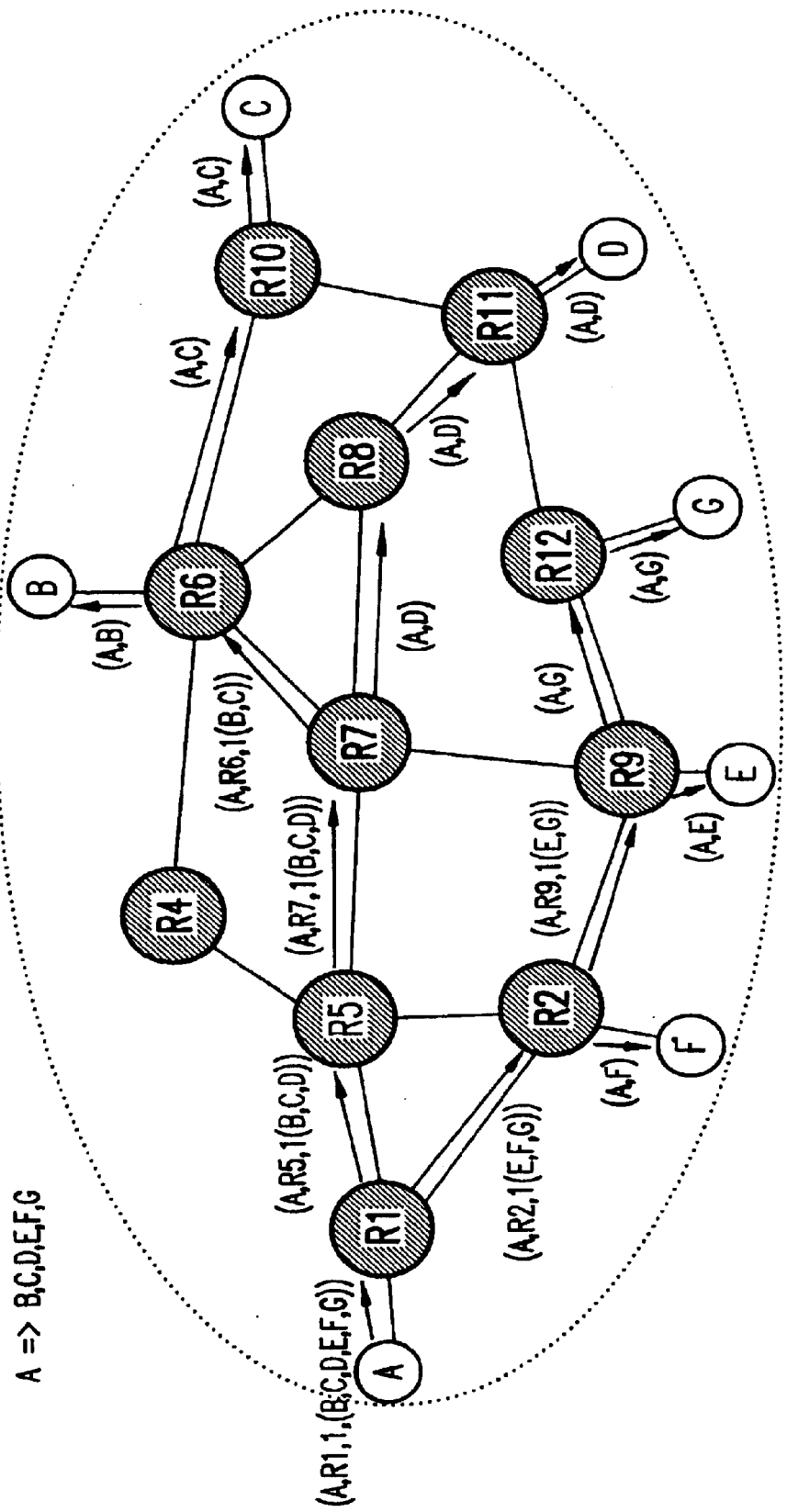
FIG. 6 illustrates a third exemplary multicast routing process.

The example illustrated in FIG. 6 assumes that every router is multicast-capable, and illustrates the routing of a multicast packet of form (A,R1,1(B,C,D,E,F,G)). Each of routers R1, R2, R5, R6, R7 and R9 performs the packet "regeneration and routing" process while R8, R10, R11, and R12 simply perform the conventional routing of unicast packets.

Thus, with the present invention, an unlimited number of "small" groups of multicasts can be supported without involving the Class D type multicast reservation, thereby resulting in an efficient operation.

In the invention, each multicast packet (e.g., indicated by MC=1) carries multicast destinations, and its IP destination address is one of a plurality of multicast-capable routers in the network. The invention takes a conventional routing table and extends its to include a multicast capable destination (e.g., MD), thereby resulting in the above-mentioned efficient operation.

Hence, the multicast packet format is a very simple reuse of the existing packet's option field, and this requires no modification in the existing unicast packet format. Further, a packet original node (source node) by creating multicast packets takes advantage of the existence of new multicast-capable routers in the network. Each origin nodes may run a "discovery algorithm" to determined the nearest mulitcast-capable router Rmc, or the origin node may simply learn from a web site or be informed of the nearest Rmc. For the inventive routing scheme to work, only one multicast-capable router is required in the network. Finally, the multicast packet is acceptable to both conventional (unicast) and multicast-capable packet routers, and involves no special handling.

While the invention has been described in terms of several preferred embodiments, those skilled in the art will recognize that the invention can be practiced with modification within the spirit and scope of the appended claims.

What is claimed is:

1. A routing table in a router in a wide-area packet-switched network, said routing table comprising:
   a plurality of conventional routing table columns, including columns for destination D, next-node NN, and distance to destination d(D); and
   a multicast destination (MD) column having a capability to list a unicast address.

2. The routing table according to claim 1, wherein said MD column represents that, for each destination row in the routing table, an MD entry exists for use by a multicast-capable router when it has received a multicast packet for routing.

3. The routing table according to claim 1, wherein for each destination node D, the MD entry indicates either destination address Dmc of a multicast-capable router Rmc in the network or the destination D itself.

4. The routing table according to claim 3, wherein if the MD entry is equal to D when there is no router Rmc along a predetermined shortest route from a current router to a destination D.

5. The routing table according to claim 3, wherein the MD entry is equal to Dmc when there is a router Rmc along a predetermined shortest route to the destination D.

6. The routing table according to claim 1, wherein a source node (S) of a multicast packet creates a multicast packet of the form (S,Dmc,1(D1,D2, . . . ,Dk)) where address Dmc is the nearest router Rmc to the source node.

7. The routing table according to claim 6, wherein said source node is informed of the destination address Dmc of the nearest multicast-capable router Rmc.

8. The routing table according to claim 6, wherein said source node performs a discovery method to locate the nearest router Rmc.

9. The routing table according to claim 3, wherein if a received packet comprises a multicast packet, the packet is routed to its destination Dmc by referencing said routing table, and
   wherein when a packet has been received by a multicast-capable router Rmc, said Rmc router first checks whether or not the specified destination is itself, and, if the destination is not itself, the Rmc router processes the packet as a unicast packet and routes the packet,
   wherein if the destination is itself and said packet comprises a multicast packet, then the packet is processed with a multicast-routing process.

10. The routing table according to claim 9, wherein said multicast-routing process comprises:
    referencing the MD column of the routing table to perform a packet regeneration and routing process.

11. The routing table according to claim 10, wherein said packet regeneration process creates either unicast packets or multicast packets with no duplication thereof, and forwards the created packets to an existing Internet Protocol (IP) unicast packet routing process.

12. The routing table according to claim 11, wherein each regenerated packet is routed as a unicast packet and is sent to a next-node by referencing the routing table, and wherein a last multicast capable router Rmc to a destination node D creates a unicast packet, such that each destination node receives a unicast packet.

13. The routing table according to claim 9, wherein said each multicast packet carries multicast destinations, and its Internet Protocol (IP) destination address includes one of the multicast-capable routers in the network.

14. The routing table according to claim 6, wherein the source node knows its nearest router Rmc so that any multicast packet created by said source node is sent to the nearest known router Rmc having said address Dmc for multicasting, and
    wherein if the source node is unaware of such a router Rmc, the source node is prevented from creating a multicast packet, and creates only a unicast packet for each destination.

15. The routing table according to claim 6, wherein each source node is informed of its nearest router Rmc when said source node joins a network.

16. The routing table according to claim 6, wherein each source node performs a discovery process to each multicast destination to find the nearest router Rmc.

17. The routing table according to claim 6, wherein a discovery process is run to provide said routing table, said discovery process including running a traceroute to a destination, and sending each node along the traceroute a multicast packet having the form (S,Dt,1(S)), where Dt is a node along the traceroute, wherein said sending is performed from the nearest node Dt first.

18. The routing table according to claim 6, wherein when said node Dt comprises a router Rmc, a unicast packet of (S,S) or an Internet Control Message Protocol (ICMP) message is returned to the source node,
    when a unicast packet of (S,S) has been received from said node Dt and if the return is the first return, then said node Dt is chosen as the nearest router Rmc to the source node S.

19. A routing system, including:
    a routing unit for updating a next-node (NN) column of a routing table and for routing unicast packets by referencing the NN column of the routing table;
    a packet regeneration unit for referencing the multicast destination (MD) column of the routing table and for selectively creating copies of at least one of unicast and multicast packets; and
    a multicast-destination (MD) discovery unit for updating the MD column of the routing table.

20. A method of processing a packet, comprising:
    receiving a packet at a router;
    checking, by said router, if the packet's destination is itself or not;
    if the packet's destination is not the router, then routing said packet in a predetermined manner; and
    if the received packet's destination is itself and if the packet is a multicast packet such that MC=1, then forwarding the packet to a packet regeneration process.

21. The method according to claim 20, wherein the packet regeneration processing includes:
    for a packet having a form of (S,Dmc,1(D1,D2, . . . ,Dk)), for each destination, D1 through Dk, finding the multicast destination MD from the routing table;
    for those destinations having a same MD, generating a multicast packet having a form (S,MD,1(destinations))

with remaining fields in the packet the same as an originally received packet; and for each of those destinations where the MD entry is the same as the destination such that MD=D, creating a unicast packet of the form (S, D) with remaining fields in the packet the same as the originally received packet.

22. The method according to claim 21, wherein the packet regeneration processing further includes:

providing the regenerated packets to the predetermined routing process for routing.

23. The method according to claim 22, further comprising:

running an MD discovery process for each and every destination periodically.

24. The method according to claim 22, further comprising:

running a multicast destination (MD) discovery process for each destination whenever a portion of the routing table has changed, a multicast-capable router has been added, or any router has been upgraded to be multicast-capable.

25. The method according to claim 23, wherein said MD discovery process includes:

setting MD=D for every destination D in the routing table;

running a traceroute to destination D, to generate a sequence of routers Dt to the destination D; and based on the sequence of routers to the destination D, forwarding a test multicast packet of form (S, Dt, 1(S)) to a nearest router Dt, and finding the first router Dt which returns the unicast message of (S, S) or the router Dt returns no ICMP.

26. The method according to claim 25, wherein said Dt is the nearest Rmc and its address Dmc is placed in the MD entry of the routing table for the destination D, and wherein when no Rmc has been found, the MD value remains as D itself.

27. A method for extending a routing table, comprising:

adding a multicast-destination (MD) column to an existing routing table, wherein said MD column represents that, for each destination row in the routing table, there is an MD entry for use by a multicast-capable router when it has received a multicast packet for routing.

28. A method of using a routing table, comprising:

referencing a column (MD) of a routing table to perform a packet regeneration and routing process, wherein said MD column represents that, for each destination row in the routing table, there is an MD entry for use by a multicast-capable router when it has received a multicast packet for routing.

29. A method of learning of a nearest multicast-capable router by a source node, comprising:

running a traceroute to a destination; and sending each node along the traced route a multicast packet having the form (S,Dt,1(S)), where Dt is a node along the traced route, and wherein such sending is performed first from a nearest node Dt.

30. The method according to claim 29, wherein when node Dt comprises a router Rmc, a unicast packet of (S,S) or an Internet Control Message Protocol (ICMP) message is returned to the source node, when a unicast packet of (S,S) has been received from node Dt and if the return is the first return, then node Dt is chosen as the nearest router Rmc to the source node.

31. A method of regenerating a packet in a router in a network, comprising:

for a packet having a form of (S,Dmc,1(D1,D2, ... ,Dk)), for each destination, D1 through Dk, finding the multicast destination (MD) from a routing table;

for those destinations having the same MD, generating a multicast packet having a form (S,MD,1(destinations)) with remaining fields in the packet the same as an originally received packet; and for each of the destinations where the MD is the same as the destination such that MD=D, creating a unicast packet of the form (S, D) with remaining fields in the packet the same as the originally received packet.

32. The method according to claim 31, wherein the packet regeneration processing further includes:

providing the regenerated packets to an existing routing process for routing.

33. A programmable storage medium tangibly embodying a program of machine-readable instructions executable by a digital processing apparatus to perform a method of extending an existing routing table, comprising:

including a multicast-destination (MD) column in said routing table such that the MD column is for packet regeneration.

34. A programmable storage medium tangibly embodying a program of machine-readable instructions executable by a digital processing apparatus to perform a method of processing a packet, said method comprising:

receiving a packet at a router;

checking, by said router, if the packet's destination is itself or not;

if the packet's destination is not the router, then routing said packet in a predetermined manner; and if the received packet's destination is itself and if an entry in a routing table indicates that the packet is a multicast packet (e.g., MC=1), then forwarding the packet to a packet regeneration process.

35. A programmable storage medium tangibly embodying a program of machine-readable instructions executable by a digital processing apparatus to perform a method of regenerating a packet in a router in a network, said method comprising:

for a packet having a form of (S,Dmc,1(D1,D2, ... ,Dk)), for each destination, D1 through Dk, finding the multicast destination (MD) from a routing table;

for those destinations having the same MD, generating a multicast packet having a form (S,MD,1(destinations)) with remaining fields in the packet the same as an originally received packet; and for each of the destinations where the MD is the same as the destination such that MD=D, creating a unicast packet of the form (S, D) with remaining fields in the packet the same as the originally received packet.

36. A programmable storage medium tangibly embodying a program of machine-readable instructions executable by a digital processing apparatus to perform a method of learning of a nearest multicast-capable router by a source node, said method comprising:

running a traceroute to a destination; and sending each node along the traced route a multicast packet having the form (S,Dt,1(S)), where Dt is a node along the traced route, and wherein such sending is performed first from a nearest node Dt.

* * * * *